Nov. 19, 1957 A. CABURET 2,813,608
TRANSVERSELY ENGAGED CLUTCH WITH LOCKING MEANS
Filed Nov. 4, 1955

*INVENTOR.*
ALBERT CABURET

2,813,608

TRANSVERSELY ENGAGED CLUTCH WITH LOCKING MEANS

Albert Caburet, Saint-Mande, France, assignor to International Business Machines Corporation, New York, N. Y., a corporation of New York Application November 4, 1955, Serial No. 545,098

Claims priority, application France April 5, 1955

6 Claims. (Cl. 192—71)

This invention relates to a positive engaging clutch and more particularly to a clutch in which the operative condition of a dog is controlled by an armature and spring arrangement.

Such a device permits a rapid changeover from a stationary condition to full speed of a drive shaft. Clutch mechanisms of this kind have particular application in accounting machines. For example, in card feeding operations it is often necessary to start and stop the flow of cards quickly and effectively.

A clutch of this type is usually composed of a driving shaft carrying a notched disc. A coupling lever having a dog and integral with a driven shaft is controlled by a solenoid armature to bring the dog in and out of engagement with the notched disc. When the solenoid is energized, the dog enters the notch and the driving and driven shafts are coupled together for motion. When the magnet is de-energized the dog is removed from the notch to disconnect the shafts.

The principal object of this invention is to provide a novel clutching mechanism which prevents irregular declutching actions.

Another object of this invention is to provide a clutching mechanism which suppresses wrongly timed disengagement of the driving and driven shafts through an automatic latching of the coupling lever.

A further object is to provide a simple and economical process for locking the coupling lever in a given position.

Other objects of the invention will be pointed out in the following description and claims and illustrated in the drawings, which disclose, by way of example, the principle of the invention and the best mode, which has been contemplated, of applying that principle.

In the drawings:

Fig. 1 illustrates separately the components of the clutch device in order to simplify an understanding of the invention.

Figure 1:
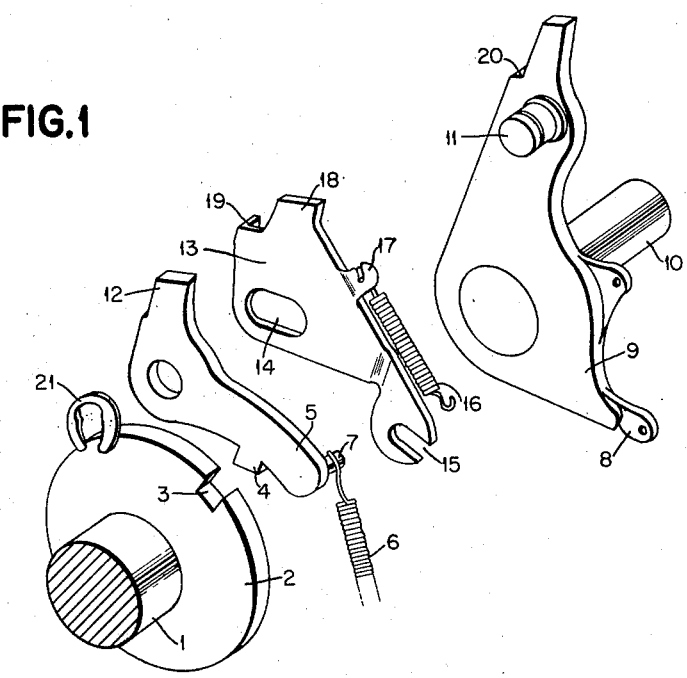
Fig. 1 is an exploded view in perspective of the device according to the invention.

In Fig. 1, driving shaft 1 carries a disc 2 provided with a notch 3. Coupling lever 5 has dog 4, which is capable of engagement with the notched disc 2. Coupling lever 5 also has a pin 7 for holding one end of spring 6. The upper end 12 of lever 5 is held or released by the armature of a clutch magnet, shown at 22 in Figs. 2 and 3. During the clockwise rotation of disc 2, dog 4 of coupling lever 12, released by armature 22, is driven in a clockwise direction by spring 6 into notch 3.

The other end of spring 6 is connected to the projecting lug 8 of plate 9. Plate 9, which is integral with driven shaft 10, carries a pin 11 around which coupling lever 5 swivels.

In accordance with this invention, a locking lever 13 is provided with the clutch mechanism described above. Such a lever has an elongated hole 14 for the entry of pin 11. This hole permits both a translating motion and a rotation of locking lever 13 with respect to plate 9. Locking lever 13 also has a slot 15, at one of its ends, into which pin 7 of lever 5 is wedged. Spring 16 has one of its ends fixed to mounting lug 17, and the other end is mounted on pin 7 of coupling lever 5. Locking lever 13 also comprises a protruding end 18 and a heel 19, which rests on shoulder 20 of plate 9, when the clutch is engaged.

Figure 2:
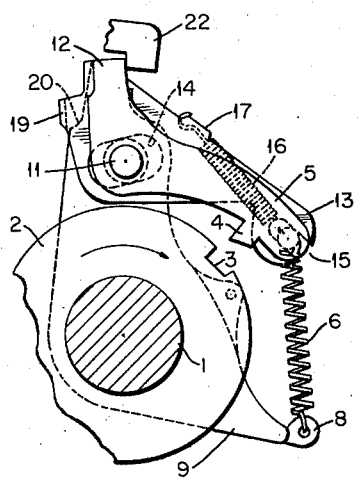
Figs. 2 and 3 are similar views showing the clutch in disengaged and engaged condition.
Figure 3:
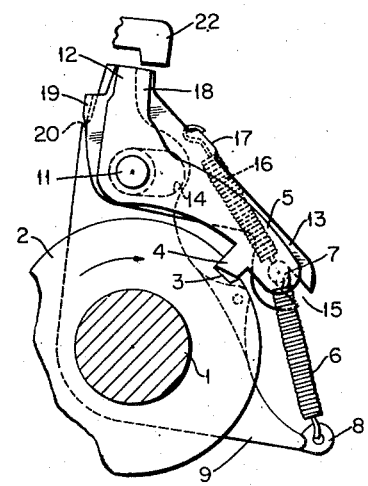

Both coupling lever 5 and locking lever 13 are secured to pin 11 of plate 9 by clip 21, which is not shown in Figs. 2 and 3 in order to simplify an understanding of the operation of this clutch device.

The operation of this clutch will be explained with reference to Figs. 2 and 3.

Fig. 2 shows the clutch in the disengaged position. In this position driving shaft 1, in its clockwise rotation, cannot drive shaft 10. Armature 22 of the clutch magnet restrains upper end 12 of coupling lever 5 and upper end 18 of locking lever 13. Dog 4 is maintained out of reach of notch 3, and springs 6 and 16 are stretched. Pin 7 is practically in the middle of slot 15, and pin 11 is in the middle of elongated hole 14 of locking lever 13. Heel 19 is disengaged from shoulder 20.

When the clutch magnet is next energized, its armature 22 picks up, releasing coupling lever 5 and causing it to swivel around its pin 11 under the action of spring 6. Dog 4 then slides over disc 2 until it falls into notch 3. At this moment, the clutching operation is completed, and shaft 10 rotates at the same speed as shaft 1.

It may be seen from Fig. 3 that locking lever 13 is caused to rotate at the same time as coupling lever 5. Furthermore, locking lever 13 effects a translating motion with respect to coupling lever 5 under the action of spring 16. Pin 7, which carries one end of spring 6, is now at the inner end of slot 15. Pin 11 is at the left end of elongated hole 14, and heel 19 is at rest upon shoulder 20.

In this engaged position, lever 5 is locked by lever 13. The presence of heel 19 against shoulder 20 prevents any counter-clockwise motion of coupling lever 5 resulting from rebound or slipping on the part of dog 4. Once dog 4 is in notch 3, it is prevented from skipping out by locking lever 13.

Subsequent de-energization of the clutch magnet releases armature 22. The armature first catches upper end 18 of locking lever 13, causing the latter to make a translating motion to the left or counter-clockwise with regard to lever 5 and plate 9. This motion enables heel 19 to leave shoulder 20. Shortly thereafter, end 12 of coupling lever 5 is stopped by armature 22. Lever 5 swivels on pin 11, pulling dog 4 out of notch 3 in preparation for the next clutching operation, as seen in Fig. 2.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A clutch device comprising a driving shaft, a disc, having a single notch, fixedly attached to said shaft, a driven shaft, a plate fixedly attached to said driven shaft, a coupling lever having a single dog movably mounted on said plate, a spring joining said coupling lever with said plate, said spring serving to engage said dog with said notched disc after said coupling lever is released, a locking lever movably mounted on said plate and capable of locking contact with said plate in operation, and a spring joining said locking lever to said coupling lever, 2. A clutch device comprising a driving means, a driven means, an engaging means and a locking means movably mounted on said driven means, single means for moving said engaging means into and out of engagement with said driving means and for moving said locking means which locks said engaging means during operation, resilient means connected between said engaging means and said locking means, with said resilient means imparting a translating motion, in one direction, to said locking means during the time that said engaging means is moved into engagement with said driving means, and with said moving means imparting a translating motion, in the opposite direction, to said locking means during the time that said engaging means is moved out of engagement with said driving means.

3. The invention according to claim 2 in which said moving means directly controls the operation of said locking means and said engaging means, with said locking means and said engaging means being released simultaneously by said moving means prior to the engagement of said engaging means with said driving means.

4. The invention according to claim 2 in which said locking means cooperates with said driven means to lock said engaging means in said driving means.

5. A clutch device comprising a driving shaft, a notched disc attached to said driving shaft, a driven shaft, a plate attached to said driven shaft, a coupling lever movably mounted on said plate, a first spring connecting said coupling lever with said plate, a lever movably mounted on said plate to lock said coupling lever during engagement with said driving shaft, a second spring connecting said locking lever with said coupling lever, with said second spring imparting a translating motion to said locking lever at the time said coupling lever is moved into engagement with said disc.

6. The invention according to claim 5 wherein said locking lever includes an end piece and said plate includes a shoulder, with said end piece being placed in contact with said shoulder after said locking lever is subjected to a translating motion.

References Cited in the file of this patent
UNITED STATES PATENTS

| | | |
|---|---|---|
| 670,036 | Schmitt | Mar. 19, 1901 |
| 1,765,527 | Gollnick et al. | June 24, 1930 |
| 2,441,314 | Ferris | May 11, 1948 |
| 2,659,467 | Zenner | Nov. 17, 1953 |